United States Patent Office 2,843,621
Patented July 15, 1958

2,843,621

PARA-AMINOBENZOATES OF ETHYNYL-CARBINOLS

William Oroshnik, Plainfield, and George Karmas, Somerville, N. J., assignors to Ortho Pharmaceutical Corporation, a corporation of New Jersey No Drawing. Application September 6, 1955
Serial No. 532,771

6 Claims. (Cl. 260—471)

This invention relates to para-aminobenzoates of ethynylcarbinols, the novel compounds of this invention being represented by the following graphic formulas:

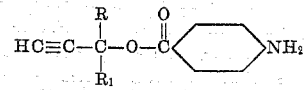

in which R represents a hydrogen atom or a methyl, ethyl, normal propyl or isopropyl radical and $R_1$ represents a hydrogen atom or a methyl, ethyl, vinyl or phenyl radical, and

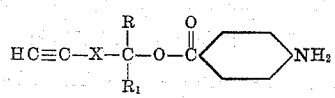

in which X represents a methylene, methyl methylene, ethylene, methyl ethylene, vinylene, or a methyl vinylene radical and in which R and $R_1$ have the same significance as above.

The general method of preparing the new and novel para-aminobenzoates of ethynylcarbinols to which the present invention is directed is as follows:

One mol of para-nitrobenzoyl chloride is reacted in the presence of a suitable base, such as pyridine, with one mol of an ethynyl carbinol, the carbinol being preferably added in one portion to the para-nitrobenzoyl chloride. The reaction results in the production of a para-nitrobenzoate of the ethynylcarbinol. After addition of the carbinol has been completed, the mixture is heated, preferably to a temperature between 60° and 70° C., for approximately ½ hour. At the end of the heating period, water is added to the reaction mixture and the reaction product is removed by extracting the oily layer which separates with a suitable organic solvent. Any organic base is removed from the solvent solution by washing with a dilute aqueous solution of an organic acid such as hydrochloric acid. The ether or benzene layer which contains the reaction product free from organic base, is washed with a dilute aqueous solution of an alkali such as sodium or potassium bicarbonate to remove any para-nitrobenzoic acid formed during the course of the reaction and then dried over a dehydrating agent such as sodium sulphate or calcium chloride. The organic solvent is finally removed by distillation under reduced pressure.

The resulting para-nitrobenzoate of the ethynylcarbinol may be reduced to the corresponding amino compound by either chemical or catalytic means, the preferred means being reduction with iron and a dilute nonoxidizing acid. In the preferred reduction method the para-nitrobenzoate of an ethynylcarbinol is mixed with from four to five mols of powdered iron, water is added and then a small amount of nonoxidizing acid, such as hydrochloric or acetic acid is added. The reaction mixture is agitated for several hours during which time the nitro group of the para-nitrobenzoate of an ethynylcarbinol is reduced to an amine group. The para-aminobenzoate of an ethynylcarbinol is removed from the reaction mixture by extraction with a suitable organic solvent, such as benzene or ether, and the extracting solution is dried over magnesium sulfate or calcium chloride. The solvent is removed by any conventional means such as distillation under reduced pressure and the residue, after removal of the solvent by distillation under reduced pressure, may be purified by recrystallization if the product is a solid or by fractional distillation if the product is a liquid.

For the purpose of illustration, the following examples are set forth to illustrate the novel compounds of the invention, but are not to be construed as limiting the spirit of the invention or its scope.

EXAMPLE I

*Para-aminobenzoate of methylethynylcarbinol*

Eleven grams of methylethynylcarbinol were added in one portion to a solution of 25 grams of para-nitrobenzoyl chloride in solution in 100 ml. of pyridine. After the initial exothermic reaction had subsided, the mixture was heated at a temperature of 60–70° C. for one hour and then poured into an ice-cold mixture of 200 ml. of methylene dichloride and 800 ml. of 1.5 normal hydrochloric acid. The mixture was well agitated during the addition and for a short period thereafter. Agitation was then discontinued and the methylene dichloride layer which separated from the water layer was removed and washed with 25 ml. water and then with 100 ml. of aqueous sodium bicarbonate solution. The methylene dichloride solution was dried over fifteen grams of anhydrous magnesium sulphate, the magnesium sulphate was removed by filtration and the methylene dichloride was removed by distillation under reduced pressure. The residual reaction product was distilled at a temperature of 96–98° C. at a pressure of one micron of mercury. 23.5 grams of para-nitrobenzoate of methylethynylcarbinol were obtained which solidified at room temperature. The solidified product was recrystallized from a ligroin-benzene mixture and the recrystallized material had a melting point of 66–67° C.

Calculated for $C_{11}H_9NO_4$: Carbon=60.20%; hydrogen=4.14%. Found: Carbon=60.35%; hydrogen=4.13%.

A mixture of fifteen grams of recrystallized para-nitrobenzoate of methylethynylcarbinol, 40 grams reduced iron powder, 10 grams magnesium chloride, 40 ml. benzene, 40 ml. water, and 0.1 ml. 12-normal hydrochloric acid were stirred vigorously. An exothermic reaction took place and the temperature of the mixture rapidly rose to 40° C. External heat was applied to the reaction mixture in order to maintain the reaction mixture at 45° C. and stirring was continued for three hours thereafter. The reaction mixture was filtered with suction and the filter cake was thoroughly washed with 120 ml. of hot benzene and then with 200 ml. of ethyl ether. The ether-benzene solution was separated from the aqueous portion of the filtrate and evaporated to dryness under vacuum. The solid residue which remained was recrystallized from benzene and 12.3 grams of para-aminobenzoate of methylethynylcarbinol, having a melting point of 119–120° C., were obtained.

Calculated for $C_{11}H_{11}NO_2$: Carbon=69.81%; hydrogen=5.86%. Found: Carbon=69.85%; hydrogen=5.85%.

EXAMPLE II

*Para-aminobenzoate of ethylethynylcarbinol*

13.5 grams of ethylethynylcarbinol were added in one portion to a solution of 25 grams of para-nitrobenzoyl chloride in 100 ml. of pyridine. The esterification reaction and the subsequent isolation of the para-nitrobenzoate were conducted in the same manner as in Example I. 25.8 grams of the para-nitrobenzoate of ethylethynylcarbinol, having a boiling point of 98–100° C. at a pressure of one micron, were obtained.

Calculated for $C_{12}H_{11}NO_4$: Nitrogen=6.01%. Found: Nitrogen=5.90%.

Thirteen grams of distilled para-nitrobenzoate of ethylethynylcarbinol were reduced with a mixture of 30 grams reduced iron powder, 8 grams magnesium chloride, 30 ml. benzene, 40 ml. water and 0.1 ml. of 12-normal hydrochloric acid. The reaction and isolation of the reduction product were conducted as in Example I. The oily residue obtained after removal of the ether-benzene from the solution under reduced pressure was distilled at a temperature of 120–125° C. at a pressure of one micron of mercury. 8.2 grams of the para-aminobenzoate of ethylethynylcarbinol were obtained. The distilled material was recrystallized from ligroin containing four percent ethyl ether and the recrystallized material, which was in the form of pale yellow flakes, had a melting point of 65–66° C.

Calculated for $C_{12}H_{13}NO_2$: Carbon=70.87%; hydrogen=6.44%. Found: Carbon=70.88%; hydrogen=6.39%.

EXAMPLE III

*Para-aminobenzoate of normal-propylethynylcarbinol*

23.5 grams of normal-propylethynylcarbinol were added in one portion to a solution of 40 grams of para-nitrobenzoyl chloride in 100 ml. of pyridine. The esterification reaction and subsequent isolation of the reaction product were conducted as in Example I. The reaction product was distilled at a temperature of 105–110° C., and at a pressure of one micron of mercury. 32 grams of para-nitrobenzoate of normal-propylethynylcarbinol were obtained. The distilled product was recrystallized from ligroin and the recrystallized product, which was in the form of small buff flakes, had a melting point of 52–53° C.

Calculated for $C_{13}H_{13}NO_4$: Carbon=63.13%; hydrogen=5.29%. Found: Carbon=63.43%; hydrogen=5.20%.

Twenty-five grams of distilled and recrystallized para-nitrobenzoate of normal-propylethynylcarbinol was reduced by means of a mixture of 80 grams reduced iron powder, 13 grams magnesium chloride, 60 ml. benzene, 70 ml. water and 0.1 ml. 12-normal hydrochloric acid. The reduction procedure corresponded to that of Example I. The residue remaining after removal of ether and benzene under reduced pressure was distilled at a temperature of 120–130° C. and at a pressure of one micron of mercury. 18.5 grams of para-aminobenzoate of normal-propylethynylcarbinol were obtained. The distilled product was recrystallized from an ether-hexane mixture and the recrystallized mixture which was in the form of small colorless flakes had a melting point of 64–65° C.

Calculated for $C_{13}H_{15}NO_2$: Carbon=71.80%; hydrogen=6.95%. Found: Carbon=71.68%; hydrogen=6.85%.

EXAMPLE IV

*Para-aminobenzoate of isopropylethynylcarbinol*

Fifteen grams of isopropylethynylcarbinol were added in one portion to a solution of 25 grams of para-nitrobenzoyl chloride in 100 ml. of pyridine. The esterification reaction and subsequent isolation of the reaction product were conducted as in Example I. 25.3 grams of the para-nitrobenzoate of isopropylethynylcarbinol, having a boiling point of 105–107° C. at a pressure of one micron of mercury, were obtained. The distilled product was recrystallized from ligroin and the recrystallized product, which was in the form of small yellow flakes, had a melting point of 58–59° C.

Calculated for $C_{13}H_{13}NO_4$: Carbon=63.13%; hydrogen=5.29%. Found: Carbon=63.10%; hydrogen=5.12%.

Sixteen grams of distilled and recrystallized para-nitrobenzoate of isopropylethynylcarbinol was reduced by means of a mixture of 40 grams reduced iron powder, 10 grams magnesium chloride, 60 ml. water, 60 ml. benzene and 0.1 ml. 12-normal hydrochloric acid. The reduction procedure corresponded to that of Example I. The oily residue remaining after removal of the ether and benzene by evaporation, was distilled at a temperature of 125–130° C. at a pressure of one micron of mercury. 8.9 grams of para-aminobenzoate of isopropylethynylcarbinol, having a refractive index of 1.5723, were obtained.

Calculated for $C_{13}H_{15}NO_2$: Carbon=71.80%; hydrogen=6.95%. Found: Carbon=71.72%; hydrogen=6.92%.

EXAMPLE V

*Para-aminobenzoate of methylethylethynylcarbinol*

Fifteen grams of methylethylethynylcarbinol were added in one portion to a solution of 25 grams of para-nitrobenzoyl chloride in 100 ml. of pyridine. The esterification reaction and subsequent isolation of the reaction product were conducted as in Example I. Twenty-nine grams of para-nitrobenzoate of methylethylethynylcarbinol, having a boiling point of 110–115° C. at a pressure of one micron of mercury, were obtained. The distilled product was recrystallized from a benzene-ligroin mixture and the recrystallized product, which was in the form of small yellow flakes, had a melting point of 72–73° C.

Calculated for $C_{13}H_{13}NO_4$: Carbon=63.13%; hydrogen=5.29%. Found: Carbon=63.02%; hydrogen=5.24%.

Sixteen grams of distilled and recrystallized para-nitrobenzoate of methylethylethynylcarbinol was reduced by means of a mixture of 40 grams reduced iron powder, 8 grams magnesium chloride, 50 ml. water, 50 ml. benzene and 0.1 ml. 12-normal hydrochloric acid. The reduction procedure corresponded to that of Example I. The oily residue remaining, after removal of the ether and benzene under reduced pressure, was distilled at a temperature of 125–130° C. and at a pressure of one micron of mercury. 11.5 grams of para-aminobenzoate of methylethylethynylcarbinol, which was in the form of a viscous yellow oil, were obtained.

Calculated for $C_{13}H_{15}NO_2$: Carbon=71.80%; hydrogen=6.95%. Found: Carbon=71.64%; hydrogen=6.96%.

EXAMPLE VI

*Para-aminobenzoate of methylethylpropargylcarbinol*

Sixteen grams of methylethylpropargylcarbinol were added in one portion to a solution of 25 grams of para-nitrobenzoyl chloride in 100 ml. of pyridine. The esterification reaction and subsequent isolation of the reaction product were conducted as in Example I. The solid residue remaining, after evaporation of the methylene dichloride solution, was recrystallized from heptane. 19.3 grams of the para-nitrobenzoate of methylethylpropargylcarbinol, which was in the form of small cream-colored flakes having a melting point of 57–58° C., were obtained.

Calculated for $C_{14}H_{15}NO_4$: Nitrogen=5.36%. Found: Nitrogen=5.21%.

Fifteen grams of the recrystallized para-nitrobenzoate of methylethylpropargylcarbinol was reduced by means of a mixture of 40 grams reduced iron powder, 10 grams magnesium chloride, 50 ml. water, 50 ml. benzene and 0.1 ml. 12-normal hydrochloric acid. The reduction procedure corresponded to that of Example I. The oily residue remaining after evaporation of the ether and benzene under reduced pressure was distilled at 120–125° C. at a pressure of one micron of mercury. 6.6 grams of para-aminobenzoate of methylethylpropargylcarbinol, which was in the form of a viscous, pale yellow oil, were obtained.

Calculated for $C_{14}H_{17}NO_2$: Carbon=72.68%; hydrogen=7.41%. Found: Carbon=72.73%; hydrogen=7.39%.

EXAMPLE VII

*Para-aminobenzoate of methylvinylethynylcarbinol*

Sixteen grams of methylvinylethynylcarbinol were added in one portion to a solution of 25 grams of para-nitrobenzoyl chloride in 100 ml. of pyridine. The esterification reaction and subsequent isolation of the reaction product were conducted as in Example I. The solid residue which remained after removal of the methylene dichloride was recrystallized from a benzene-ligroin mixture. Twenty-four grams of the para-nitrobenzoate of methylvinylethynylcarbinol, which was in the form of cream-colored flakes having a melting point of 92–93° C., were obtained.

Calculated for $C_{13}H_{11}NO_4$: Carbon=63.63%; hydrogen=4.52%. Found: Carbon=63.46%; hydrogen=4.59%.

Twenty grams of distilled and recrystallized para-nitrobenzoate of methylvinylethynylcarbinol was reduced by means of a mixture of 60 grams reduced iron powder, 12 grams magnesium chloride, 60 ml. water, 60 ml. benzene and 0.1 ml. 12-normal hydrochloric acid. The reduction procedure corresponded to that of Example I. The solid residue which remained after removal of the ether and benzene was recrystallized from an ether-hexane mixture and the recrystallized product, which was in the form of hard cream-colored granules, had a melting point of 92–94° C. Thirteen grams of para-aminobenzoate of methylvinylethynylcarbinol were obtained.

Calculated for $C_{13}H_{13}NO_2$: Carbon=72.57%; hydrogen=6.08%. Found: Carbon=72.82%; hydrogen=6.24%.

EXAMPLE VIII

*Para-aminobenzoate of methylphenylethynylcarbinol*

Twenty grams of methylphenylethynylcarbinol were added in one portion to a solution of 25 grams of para-nitrobenzoyl chloride in 100 ml. of pyridine. The esterification reaction and subsequent isolation of the reaction product were conducted as in Example I. The solid residue which remained after removal of the methylene dichloride was recrystallized from heptane. 25.7 grams of recrystallized product, which was in the form of hard, irregular yellow prisms, having a melting point of 104–105° C., were obtained.

Calculated for $C_{17}H_{13}NO_4$: Carbon=69.16%; hydrogen=4.47%. Found: Carbon=69.25%; hydrogen=4.41%.

Fourteen grams of recrystallized para-nitrobenzoate of methylphenylethynylcarbinol was reduced by means of a mixture of 50 grams reduced iron powder, 12 grams magnesium chloride. 50 ml. water, 50 ml. benzene and 0.1 ml. 12-normal hydrochloric acid. The reduction procedure corresponded to that of Example I. The solid residue remaining after removal of ether and benzene was recrystallized from benzene. 2.5 grams of the para-aminobenzoate of methylphenylethynylcarbinol, which was in the form of small, cream-colored needles, having a melting point of 163–164° C., were obtained.

Calculated for $C_{17}H_{15}NO_2$: Carbon=77.00%; hydrogen=5.70%. Found: Carbon=76.99%; hydrogen=5.71%.

EXAMPLE IX

*Para-aminobenzoate of 3-methylpentene-2-yne-4-ol-1*

Fifteen grams of 3-methylpentene-2-yne-4-ol-1 were added in one portion to a solution of thirty grams of para-nitrobenzoyl chloride in 200 ml. of pyridine. The esterification and subsequent isolation of the reaction product were conducted as in Example I. The solid residue which remained after removal of the methylene dichloride by distillation under reduced pressure was recrystallized from heptane. 34.5 grams of recrystallized para-aminobenzoate of 3-methylpentene-2-yne-4-ol-1 which was in the form of lemon-yellow granules, having a melting point of 60–61° C., were obtained.

Calculated for $C_{13}H_{11}NO_4$: Carbon=63.63%; hydrogen=4.52%. Found: Carbon=64.07%; hydrogen=4.70%.

Thirty-two grams of recrystallized para-nitrobenzoate of 3-methylpentene-2-yne-4-ol-1 were reduced by means of a mixture of 80 grams reduced iron powder, 15 grams magnesium chloride, 200 ml. water, 200 ml. benzene and 0.1 ml. 12-normal hydrochloric acid. The reduction procedure corresponded to that of Example I. The solid residue remaining after removal of the ether and benzene by distillation under reduced pressure was recrystallized from 1200 ml. of heptane. The recrystallized para-aminobenzoate of 3-methylpentene-2-yne-4-ol-1 obtained was in the form of cream-colored granules which had a melting point of 97–98° C.

Calculated for $C_{13}H_{13}NO_2$: Carbon=72.57%; hydrogen=6.08%. Found: Carbon=72.48%; hydrogen=6.28%.

EXAMPLE X

The novel compounds of this invention were tested for local anesthetic activity by the frog's foot method. According to this method, the reflex time was determined by immersing a foot of a decapitated frog in 0.5 percent aqueous hydrochloric acid, the normal reflex time being two to five seconds after immersion. The acid was rinsed off and the frog's foot was immersed for twenty minutes in a dilute solution of the compound to be tested in 50 percent aqueous propylene glycol solution. The compound was rinsed off and the frog's foot was immersed in 0.5 percent aqueous hydrochloric acid solution, the end point of anesthesia being taken as the reappearance of a reflex of the foot. The results of the frog's foot test are given in the table below and represent the minimum effective concentration of each compound tested which prevented a recurrence of a reflex of a frog's foot, the concentration being expressed in percent by weight of the compound in 50 percent aqueous propylene glycol solution.

|  | Percent |
|---|---|
| Para-aminobenzoate of methylethynylcarbinol | 0.06 |
| Para-aminobenzoate of ethylethynylcarbinol | 0.03 |
| Para-aminobenzoate of isopropylethynylcarbinol | 0.015 |
| Para-aminobenzoate of methylethylethynylcarbinol | 0.06 |
| Para-aminobenzoate of methylethylpropargylcarbinol | 0.03 |
| Para-aminobenzoate of methylvinylethynylcarbinol | 0.03 |
| Para-aminobenzoate of methylphenylethynylcarbinol | 0.25 |

The para-aminobenzoates of the ethynylcarbinols of this invention may be present in solution in oils, as well as incorporated into ointments or creams and applied as such when used as local anesthetics. Oils which have been found particularly suitable include vegetable oils such as peanut oil, sesame oil, olive oil and cotton seed oil. Lower alkyl esters of fatty acids, the alkyl group preferably having not more than eight carbon atoms, have also been found suitable and among this group, ethyl and propyl oleates as well as ethyl and propyl esters of the fatty acids of oils such as olive oil, sesame oil, coconut oil and peanut oil are particularly suitable. By way of example, a solution of the para-aminobenzoate of ethylethynylcarbinol is prepared by dissolving 0.5 gram of the substance in 100 cc. of sesame oil or in 100 cc. of the ethyl ester of the fatty acid of coconut oil. This solution is an effective local anesthetic for topical applications.

What is claimed is:

1. A para-aminobenzoate of an ethynylcarbinol selected from the class which consists of a compound of the formula:

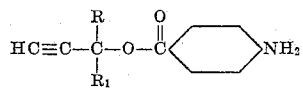

in which R is selected from the class consisting of a hydrogen atom and methyl, ethyl, normal propyl, and isopropyl radicals and $R_1$ is selected from the class consisting of a hydrogen atom and methyl, ethyl, vinyl and phenyl radicals; and a compound of the formula:

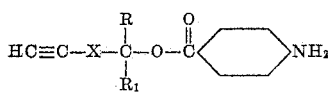

in which R and $R_1$ have the same significance as above and X is selected from the class consisting of methylene, methyl methylene, ethylene, methyl ethylene, vinylene, and methyl vinylene radicals.

2. Para-aminobenzoate of 3-methylpentene-2-yne-4-ol-1.
3. Para-aminobenzoate of ethylethynylcarbinol.
4. Para-aminobenzoate of methylphenylethynylcarbinol.
5. Para-aminobenzoate of methylethylethynylcarbinol.
6. Para-aminobenzoate of methylethylpropargylcarbinol.

References Cited in the file of this patent

UNITED STATES PATENTS

| | | |
|---|---|---|
| 950,936 | Luders | Mar. 1, 1910 |
| 1,360,994 | Adams et al. | Dec. 7, 1920 |
| 2,340,701 | Schlichting et al. | Feb. 1, 1944 |

FOREIGN PATENTS

| | | |
|---|---|---|
| 505,421 | Belgium | Sept. 15, 1951 |